United States Patent
Kanesaka et al.

(10) Patent No.: US 6,897,923 B2
(45) Date of Patent: May 24, 2005

(54) REFLECTIVE-TYPE LIQUID CRYSTAL DISPLAY DEVICE INCLUDING RESIN LAYER WITH FINE PARTICLES

(75) Inventors: Kazumi Kanesaka, Chounan (JP); Tomoaki Tsuboka, Mobara (JP); Hisashi Yoshida, Mobara (JP); Masato Sakurai, Mobara (JP)

(73) Assignees: Hitachi, Ltd., Tokyo (JP); Hitachi Device Engineering Co., Ltd., Chiba-ken (JP)

( * ) Notice: Subject to any disclaimer, the term of this patent is extended or adjusted under 35 U.S.C. 154(b) by 58 days.

(21) Appl. No.: 10/145,019

(22) Filed: May 15, 2002

(65) Prior Publication Data

US 2002/0176039 A1 Nov. 28, 2002

(30) Foreign Application Priority Data

May 28, 2001 (JP) ........................................ 2001-158604

(51) Int. Cl.[7] ..................... G02F 1/1335; G02F 1/1333; G02F 1/1339
(52) U.S. Cl. ........................ 349/113; 349/122; 349/138; 349/155
(58) Field of Search ................................ 349/113, 122, 349/138, 155

(56) References Cited

U.S. PATENT DOCUMENTS

| 5,526,149 A | * | 6/1996 | Kanbe et al. ................ 349/113 |
| 5,627,667 A | * | 5/1997 | Mizushima et al. ......... 349/124 |
| 5,708,486 A | * | 1/1998 | Miyawaki et al. ............. 349/44 |
| 5,714,247 A | * | 2/1998 | Kuo et al. ................... 428/323 |
| 5,936,688 A | * | 8/1999 | Tsuda et al. ................. 349/113 |
| 6,184,956 B1 | * | 2/2001 | Kang et al. ................. 349/113 |
| 6,693,746 B1 | * | 2/2004 | Nakamura et al. .......... 359/580 |
| 2002/0093610 A1 | * | 7/2002 | Furukawa et al. ........... 349/113 |

FOREIGN PATENT DOCUMENTS

| EP | 1 094 340 A2 | 9/2000 |
| JP | 11-202326 | 1/1998 |
| JP | 2000-162589 | 11/1998 |

* cited by examiner

Primary Examiner—Tarifur R. Chowdhury
(74) Attorney, Agent, or Firm—Reed Smith LLP; Stanley P. Fisher, Esq.; Juan Carlos A. Marquez, Esq.

(57) ABSTRACT

The present invention provides a reflective-type liquid crystal display device with a reflection electrode thereof formed on a resin binder layer wherein a number of fine particles are mingled in the resin binder layer and protrude their upper portions from the resin binder layer to make an upper surface of the resin binder layer rough, and improves reflection property thereof while simplifying a structure and manufacturing process therefor.

14 Claims, 8 Drawing Sheets

REFLECTIVE-TYPE LIQUID CRYSTAL DISPLAY DEVICE INCLUDING RESIN LAYER WITH FINE PARTICLES

BACKGROUND OF THE INVENTION

1. Field of the Invention

The present invention relates to a liquid crystal display device, and more particularly to a reflective-type liquid crystal display device which is provided with reflective electrodes which can efficiently reflect incident light particularly from an observation side thus enhancing the visibility.

2. Description of the Related Art

In a liquid crystal display device, a liquid crystal layer is sandwiched between a pair of substrates made of glass or the like which have electrodes for forming pixels and switching elements and images which are electronically formed are visualized by irradiating an external light. A driving method of this type of liquid crystal display device is roughly classified into two methods. Spacers which are made of epoxy resin, glass or the like and are formed in a bead shape or in a columnar shape may be interposed between both substrates to ensure a gap between both substrates. When the spacers are formed in a bead shape, they are referred to as "spacer beads".

One of these methods is a so-called simple-matrix-type in which a large number of linear electrodes which cross each other are formed on respective inner surfaces of a pair of substrates and pixels are formed on the crossing portions and the other method is an active-matrix-type in which a large number of switching elements such as thin film transistors for selecting respective pixels are arranged in a matrix array.

With respect to electronic equipment such as portable information terminals (so-called PDA (Personal Digital Assistant)) and portable telephones, which are required to consume small power, as a liquid crystal display device which constitutes an image monitor of such an electronic equipment, a reflective-type liquid crystal display device or a semi-transmissive/reflective-type liquid crystal display device has been widely adopted. The reflective-type liquid crystal display device includes a reflective film, a reflective electrode or a reflective plate on an inner surface or a back surface of a substrate opposite to an observation-side substrate (hereinafter, referred to as "one substrate"). Here, light (ambient light) which is incident from the observation-side substrate (hereinafter referred to as "another substrate") is reflected on the above-mentioned reflection film or the like, is made to pass through a liquid crystal layer, and is subjected to the intensity modulation with electronic images formed in the liquid crystal layer, and is irradiated from the above-mentioned another substrate whereby the electronic images are visualized.

Further, there has been known a liquid crystal display device which adopts a display method called a semi-transmissive/reflective type display method which provides light transmission apertures or slits in portions of the reflective film or the like and light from a back surface of the above-mentioned one substrate is made to pass through the light transmission apertures toward the other substrate side and is visualized. Here, the reflective-type liquid crystal display device which will be explained hereinafter in conjunction with this specification and drawings is also applicable to the above-mentioned semi-transmissive/reflective type liquid crystal display device.

There has been proposed a liquid crystal display device which forms reflective electrodes having rough surfaces by forming a resin layer (resin binder layer) having a rough surface on one substrate and forming reflective films (hereinafter also referred to as "reflective electrodes" or "metal reflection films") on the resin layer (Japanese Patent Laid-open No. 75237/1994, Japanese Patent Laid-open No. 218906/1995, Japanese Patent Laid-open No. 258617/1999, Japanese Patent Laid-open No. 316371/1999). Further, there has been also proposed a liquid crystal display device which forms the rough surface on reflective electrodes and enhances the reflection efficiency by scattering fine particles (hereinafter referred to as "beads") made of resin material or the like and forming the reflective electrodes on the beads (Japanese Patent Laid-open No. 323196/1999, Japanese Patent Laid-open No. 330106/1999).

SUMMARY OF THE INVENTION

With respect to the conventional technique which forms the resin layer having the rough surface as a layer below the reflective electrodes for forming the rough surface on the reflective electrodes, a highly sophisticated patterning technique which can form a complicated rough pattern on the resin layer with high accuracy is required thus increasing man-hours and pushing up the manufacturing cost. On the other hand, with respect to the conventional technique which uses the resin binder in which fine particles are mixed, since the light is diffused making use of the difference of refractive indices of the mixed fine particles and the resin binder, the enhancement of the utilization efficiency of light is limited. In this manner, the acquisition of the novel means which can enhance the reflection efficiency of the reflective films has been one of tasks to be satisfied.

Accordingly, it is an object of the present invention to solve the above-mentioned drawbacks of the conventional techniques in the reflective-type liquid crystal display device and to provide a reflective-type liquid crystal display device which can simplify the structure and the manufacturing steps and is provided with reflective electrodes of high reflection performance.

To achieve the above-mentioned object, the present invention is characterized in that with respect to a resin binder layer in which a large number of fine particles are mixed, rough surfaces are formed on reflection surfaces of reflective electrodes by protruding upper portions of the fine particles from the resin binder layer. These fine particles are made of hard resin such as epoxy resin or the like, glass, other organic material or inorganic material. Provided that the particle size of the fine particles is approximately 2 to 4 $\mu$m, these particles can be called ultra fine particles compared to the previously-mentioned spacer beads.

The film thickness of the resin binder layer in which these fine particles are mixed is less than the average diameter of fine particles. Assuming the average particle size of the fine particles as 3 $\mu$m, it is preferable to set the film thickness of the resin binder layer to approximately $\frac{2}{3}$ of the average diameter of the fine particles. However, as will be described below, depending on the shape of the adopted fine particles and other conditions, the size of the fine particles and the film thickness of the resin binder layer should be optimized based on the reflection performance of the targeted reflective electrodes.

The shape of the rough surfaces of the reflective electrodes is adjusted based on the shape (spherical shape, elliptical shape, other shapes), the particle size or the average particle size or the effective diameter, the distribution of the particle size, the size or the distribution density per unit area of the mixed fine particles.

Further, by performing the patterning which applies photosensitivity to the resin layer or the resin binder layer using a photolithography technique, the fine particles at undesired portions are removed so as to form electrode conductive portions on the substrate. To describe typical constitutions of the reflective-type liquid crystal display device according to the present invention, they are as follows.

Constitution (1)

In a reflective-type liquid crystal display device in which a liquid crystal layer is interposed between a pair of substrates and reflective electrodes which reflect incident light from a side of another of the pair of substrates toward the another substrate thereof are formed on an inside surface of one of the pair of substrates, wherein a resin binder layer into which a number of fine particles are mingled is disposed between the one substrate and the reflective electrodes, and the upper portions of the fine particles are protruded from the resin binder layer to make reflection surfaces of the reflective electrodes rough.

Due to such a constitution, it is unnecessary to perform the patterning of the resin layer which requires complicated steps. Further, it is possible to control the magnitude of roughness of the reflective electrodes formed on the upper layer by adjusting the degree of dispersion, the size of the fine particles mingled in the resin layer or the degree of protrusion of portions of the fine particles protruded from the surface of the resin binder layer. Accordingly, the steps can be simplified and the desired reflection performance can be easily obtained.

Constitution (2)

In the constitution (1), the reflective-type liquid crystal display device is characterized in that switching elements for selecting pixels are provided to the inside surface of the one of the pair of substrates. This constitution is provided for applying the present invention to a liquid crystal display device adopting an active-matrix-type such as a thin film transistor (TFT) method or the like.

Constitution (3)

In the constitution (2), a color filter is provided to an inside surface of the another of the pair of substrates. In this constitution, the color filter is formed on the substrate side which faces the substrate having the reflective electrode by way of the liquid crystal layer. This constitution is provided for applying the present invention to a reflective-type liquid crystal display device adopting an active-matrix-type.

Constitution (4)

In either one of the constitution (1) or the constitution (2), a color filter is provided to the inside surface of the one of the pair of substrates. In this constitution, the color filter is formed on the substrate side having the reflective electrodes. This constitution is served for applying the present invention to either a simple-matrix-type reflective-type liquid crystal display device or an active-matrix-type reflective-type liquid crystal display device.

Constitution (5)

In the constitution (4), the color filter is provided to the side of the reflective electrode close to the another of the pair of substrates. In this constitution, the color filter is formed on the substrate side which faces the substrate having the reflective electrode by way of the liquid crystal layer. That is, this constitution is provided for applying the present invention to either a simple-matrix-type reflective-type liquid crystal display device or an active-matrix-type reflective-type liquid crystal display device.

Constitution (6)

In any one of the constitutions (1) to (5), a leveling layer is provided between the resin layer (resin binder) and the reflective electrodes. In such a constitution, by mingling the fine particles into the resin layer and by adjusting the thickness of the leveling layer which is formed such that the leveling layer covers the resin layer which makes portions of the fine particles protrude toward the reflective electrode side, the roughness of the reflective electrodes can be controlled.

Constitution (7)

In any one of the constitutions (1) to (5), the fine particles have photo-absorbency. Due to such a constitution, at the time of performing the patterning of the resin layer, the reflective electrodes and other constituent layers using a photolithography technique, the halation which is generated when the exposure light is scattered due to the minute particles and are reflected on an exposure mask can be prevented so that the formation of the undesired patterns on regions other than the pattern forming regions can be obviated.

Constitution (8)

In any one of the constitutions (1) to (7), spacer beads for preserving a gap between the pair of substrates at a predetermined value are provided therebetween. Due to such a constitution, the gap between the pair of substrates is preserved and hence, the display defect derived from the fluctuation of the so-called cell gap can be prevented.

It is needless to say that the present invention is not limited to the above-mentioned constitutions and constitutions which are disclosed in embodiments which will be described later and includes various modifications without departing from the technical concept of the present invention.

BRIEF DESCRIPTION OF THE DRAWINGS

FIG. 2A to FIG. 2C are cross-sectional views of an essential part of one substrate of the liquid crystal display device for explaining the summary of manufacturing steps of the first embodiment of the reflective-type liquid crystal display device according to the present invention, wherein

FIG. 3A to FIG. 3D are cross-sectional views of an essential part of one substrate of the liquid crystal display device for explaining the summary of manufacturing steps which follow the step shown in FIG. 2C of the first embodiment of the reflective-type liquid crystal display device according to the present invention, wherein

FIG. 6A to FIG. 6D are cross-sectional views of an essential part of a liquid crystal display device for explaining the summary of manufacturing steps which follow the step shown in FIG. 5B of the second embodiment of the reflective-type liquid crystal display device according to the present invention, wherein

FIG. 8A to FIG. 8C are cross-sectional views of an essential part of one substrate of a liquid crystal display device for explaining the summary of manufacturing steps of the third embodiment of the reflective-type liquid crystal display device according to the present invention, wherein

FIG. 9A and FIG. 9B are cross-sectional views of an essential part of the liquid crystal display device for explaining the summary of manufacturing steps which follow the step shown in FIG. 8C of the third embodiment of the reflective-type liquid crystal display device according to the present invention, wherein

DETAILED DESCRIPTION

Figure 1:
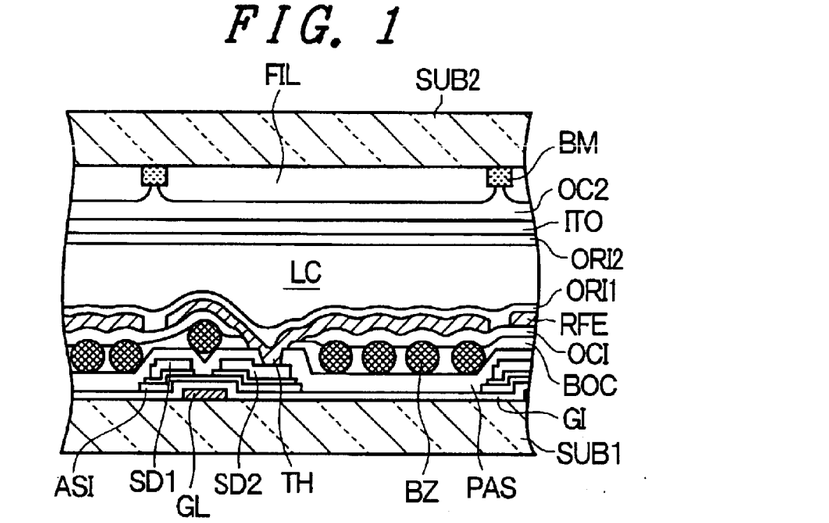
FIG. 1 is a cross-sectional view of an essential part for explaining the constitution of the first embodiment of a reflective-type liquid crystal display device of the present invention.

Preferred embodiments of a liquid crystal display device according to the present invention are explained hereinafter in conjunction with attached drawings. FIG. 1 is a cross-sectional view of an essential part for explaining the constitution of the first embodiment of a reflective-type liquid crystal display device according to the present invention. In the drawing, reference symbol SUB1 indicates one substrate and reference symbol SUB2 indicates another substrate.

In this embodiment, the present invention is applied to the reflective-type liquid crystal display device of an active-matrix type. On an inner surface of one substrate SUB1, gate electrodes GL, a gate insulation film GI, amorphous semiconductor layers ASI, a protective film PAS are formed sequentially thus constituting thin film transistors. Each amorphous semiconductor layer ASI includes a source electrode SD1 and a drain electrode SD2. The gate insulation film GI and the protective film PAS are also formed on pixel regions.

On the above-mentioned layer structure, a resin film (resin binder) BOC which is prepared by mingling fine particles BZ into photosensitive resin is formed. The fine particles BZ are constituted of fine particles made of epoxy resin or glass and have the average particle size of approximately 3 $\mu$m. Then, the film thickness of the resin film is approximately 2 $\mu$m and hence, portions of the fine particles BZ are protruded from the resin film BOC toward a reflective-electrode-REF side (another-substrate-SUB2 side). In other words, the fine particles BZ are formed such that the fine particles BZ are fixed by the resin film BOC which is embedded between the fine particles BZ.

On the resin film BOC, reflective electrodes RFE having a shape which follows the protrusions of the fine particles BZ are formed. The reflective electrodes RFE are pixel electrode/light reflective films formed of thin metal films which are preferably made of Al, Al—Nd, Cr, Ag or an alloy of these metals. The reflective electrodes RFE are connected to the source electrodes SD2 of the thin film transistors via contact holes TH thus constituting so-called pixel electrodes.

An orientation film ORI1 is formed on the reflective electrodes RFE and a given orientation treatment is provided to the orientation film ORI1 by rubbing or the like. The one substrate SUB1 and another substrate SUB2 are laminated to each other while sandwiching liquid crystal LC therebetween. To an inner surface of another substrate SUB2, color filters FIL which are defined in accordance with respective pixels by a black matrix BM, a leveling layer OC2, a common electrode IT02 and an orientation film ORI2 are provided.

In this embodiment, a protective film OC1 is provided as a layer below the reflective electrodes RFE and between the fine particles BZ and the resin film BOC so as to adjust the rough surface formed on the reflective electrodes. RFE. However, the rough surface formed on the reflective electrodes RFE may be adjusted by changing the distribution density, the height or the particle size of the fine particles BZ which are protruded from the resin film BOC or the thickness of the resin film BOC. In such a case, the above-mentioned protective film OC1 is not always necessary. The same goes for other embodiments which will be explained later.

Further, at the time of performing the patterning of the reflective electrodes RFE, by forming light-transmitting portions such as openings or slits in the reflective electrodes RFE per se or portions of peripheries thereof, the liquid crystal display device is formed into a semi-transmissive liquid crystal display device. This also goes for other embodiments which will be explained later. Due to this embodiment, the light reflection efficiency of the reflective electrodes RFE is enhanced so that a reflective-type liquid crystal display device of high quality which enables a viewer to observe bright images from any viewing angles can be obtained.

Figure 2A:
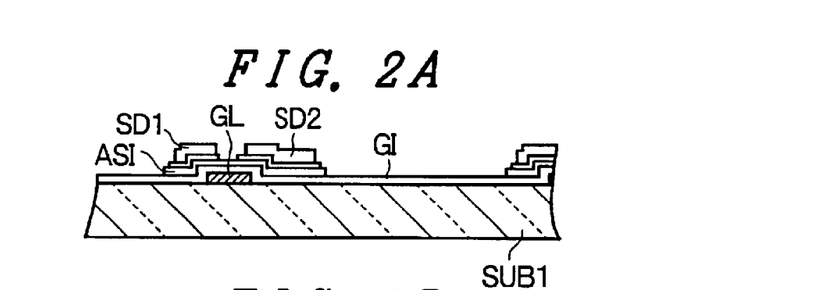
FIG. 2A shows a cross section in which a thin film transistor is formed on an upper surface of a glass substrate.
Figure 2B:
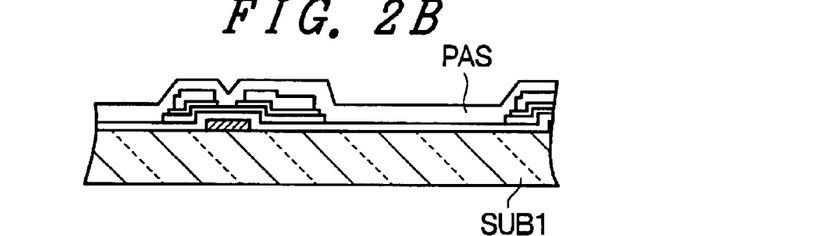
FIG. 2B shows a cross section in which an insulation film PAS is formed on the thin film transistor.
Figure 2C:
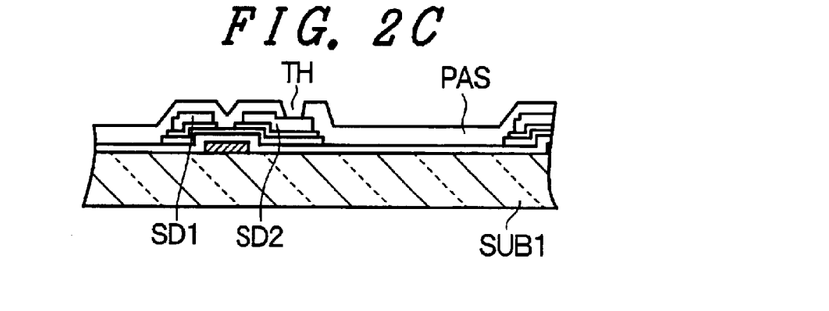
FIG. 2C shows a cross section in which a contact hole TH is formed in the insulation film PAS.

FIG. 2A to FIG. 2C are cross-sectional views of an essential part of one substrate of the liquid crystal display device for explaining the summary of manufacturing steps of the first embodiment of the reflective-type liquid crystal display device according to the present invention and FIG. 3A to FIG. 3D are similar cross-sectional views showing manufacturing steps which follow the manufacturing step shown in FIG. 2C.

First of all, using a process similar to a known semiconductor manufacturing process, the thin film transistors are formed on an upper surface of a glass substrate which is employed as one substrate SUB1 out of a pair of substrates which constitute the liquid crystal display device (FIG. 2A).

Although the thin film transistor uses the amorphous silicon semiconductor ASI, the thin film transistor is not limited to such a semiconductor. That is, the thin film transistor may be constituted of a polysilicon semiconductor or a low-temperature polysilicon semiconductor. The thin film transistor includes the gate electrode GL, the gate insulation layer GI, a layer formed of the amorphous silicon semiconductor ASI (hereinafter referred to as the semiconductor ASI), the drain electrode SD1 and the source electrode SD2. The gate insulation layer GI is also formed on another inner surface of one substrate SUB 1. An insulation film PAS is formed on this gate insulation layer GI (see FIG. 2B).

Figure 3A:
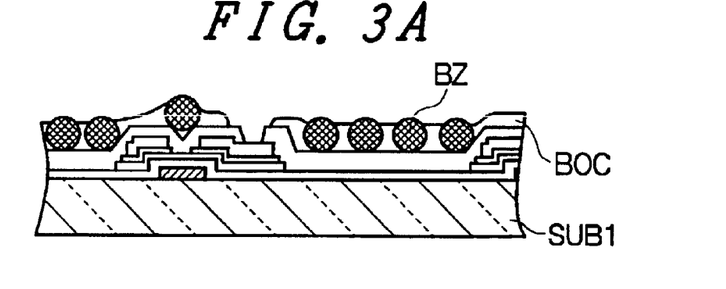
FIG. 3A shows a cross section in which a photosensitive resin film BOC in which fine particles BZ of acrylic resin are mingled is applied to an upper layer of an insulation layer PAS.

The contact hole TH is formed in the source electrode SD2 portion of the insulation layer PAS (FIG. 2C). Here, other necessary contact holes TH are also formed in the insulation layer PAS simultaneously. The photosensitive resin film BOC constituting the binder resin into which the fine particles of acrylic resin having the average particle size of 3 $\mu$m are mingled as the fine particles BZ is applied onto the insulation layer PAS as an upper layer. A film thickness of the photosensitive resin film BOC is approximately 2 $\mu$m. Accordingly, the portions of the fine particles BZ are protruded upwardly from the photosensitive resin film BOC. That is, spaces defined between respective fine particles BZ are filled with the photosensitive resin film BOC (FIG. 3A).

Figure 3B:
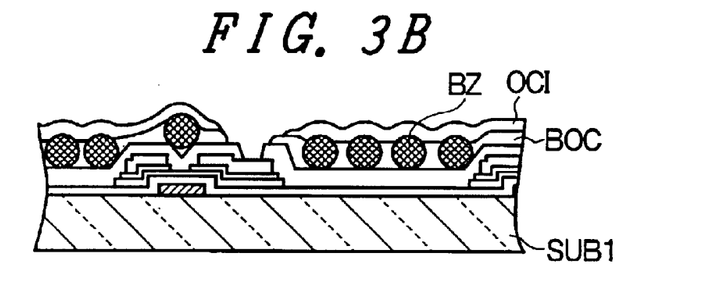
FIG. 3B shows a cross section in which the fine particles BZ and the photosensitive resin film BOC are covered with a leveling film OC1.
Figure 3C:
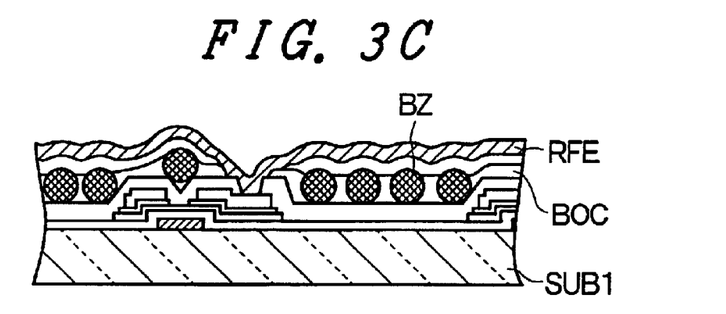
FIG. 3C shows a cross section in which a reflective electrode RFE made of an aluminum alloy film is formed.

Subsequently, the leveling film OC1 is applied to the substrate SUB1 such that the leveling film OC1 covers the fine particles BZ and the photosensitive resin film BOC (FIG. 3B). The leveling film OC1 performs a function of adjusting the degree of roughness of the reflective electrodes RFE generated by the fine particles BZ and the photosensitive resin film BOC. Thereafter, the reflective electrode RFE is formed using aluminum alloy films (FIG. 3C). The reflective electrode RFE is formed by a film forming method which may preferably be a sputtering method such that the reflective electrode RFE exhibits a rough surface which follows the rough surface of the lower layer.

Figure 3D:
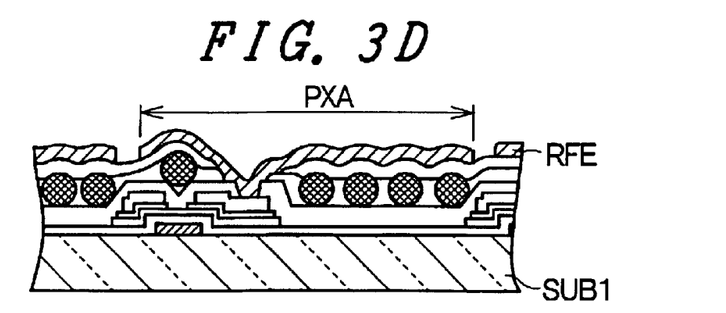
FIG. 3D shows a cross section in which the reflective electrode RFE is divided in accordance with respective pixels.

The formed reflective electrode RFE is divided into a plurality of reflective electrodes RFE in accordance with respective pixels (FIG. 3D). In FIG. 3D, a region indicated by an arrow PXA defines a range of one pixel. Thereafter, the orientation film ORI1 (FIG. 1) is formed on these pixels thus completing the manufacturing of one substrate.

Figure 4:
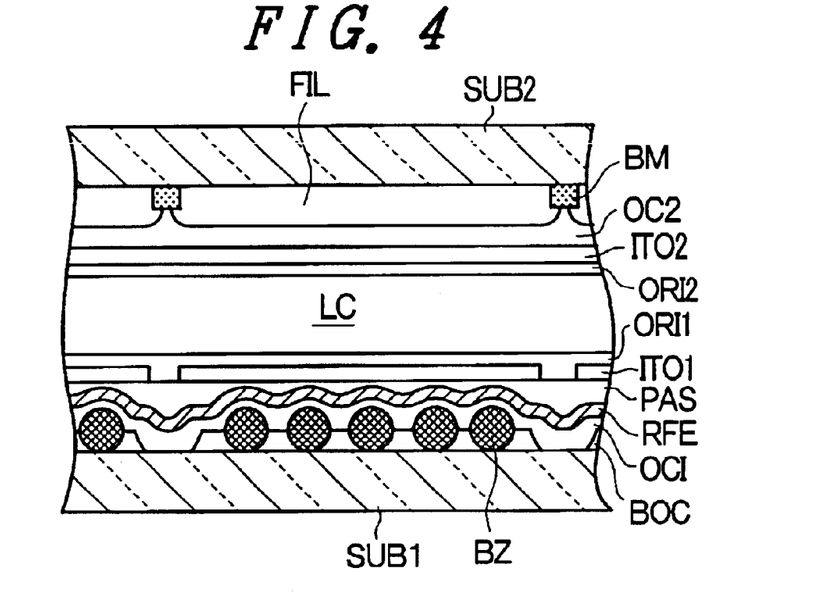
FIG. 4 is a cross-sectional view of an essential part for explaining the constitution of the second embodiment of the reflective-type liquid crystal display device according to the present invention.

FIG. 4 is a cross-sectional view of an essential part for explaining the constitution of the second embodiment of the reflective-type liquid crystal display device according to the present invention. In FIG. 4, reference symbol SUB1 indicates one substrate and reference symbol SUB2 indicates another substrate. This embodiment relates to a case in which the present invention is applied to a simple-matrix-type liquid crystal display device.

On an inner surface of a glass substrate which constitutes one substrate SUB1, a resin film BOC into which fine particles BZ similar to those of the first embodiment are mingled is formed. Portions of the fine particles BZ are protruded from the resin film BOC toward a reflective-electrode REF side (another-substrate-SUB2 side). In other words, the fine particles BZ are formed such that the fine particles BZ are fixed by the resin film BOC which is embedded between the fine particles BZ. On the resin film BOC, reflective electrodes RFE having a shape which follows the protrusions of the fine particles BZ are formed by way of a leveling film OC1. The reflective electrodes are also light reflection films formed of thin metal films which are preferably made of Al, Al—Nd, Cr, Ag or an alloy including these metals in the same manner as the previous embodiment.

An insulation film PAS is formed on the reflective electrodes RFE and ITO1s which constitute pixel electrodes are patterned on the insulation film PAS. Then, an orientation film ORI1 is formed such that the orientation film ORI1 covers the ITO1s is and is subjected to a given orientation treatment such as rubbing or the like. One substrate SUB1 and another substrate SUB2 are laminated to each other while sandwiching liquid crystal LC therebetween. To an inner surface of another substrate SUB2, color filters FIL which are defined in accordance with respective pixels by a black matrix BM, a leveling layer OC2, a counter electrode ITO2 and an orientation film ORI2 are provided.

In this embodiment, the protective film OC1 is provided as a layer below the reflective electrodes RFE and between the fine particles BZ and the resin film BOC so as to adjust the rough surface formed on the reflective electrodes RFE. However, the rough surface formed on the reflective electrodes RFE may be adjusted by changing the distribution density, the height or the particle size of the fine particles BZ which are protruded from the resin film BOC or the thickness of the resin film BOC. In such a case, the above-mentioned protective film OC1 is not always necessary.

Further, at the time of performing the patterning of the reflective electrodes RFE, by forming light-transmitting portions such as openings or slits in the reflective electrodes per se or portions of peripheries thereof, the liquid crystal display device is formed into a semi-transmissive liquid crystal display device. Due to this embodiment, the light reflection efficiency of the reflective electrodes is enhanced so that a reflective-type liquid crystal display device of high quality which enables a viewer to observe bright images from any viewing angles can be obtained.

Figure 5A:
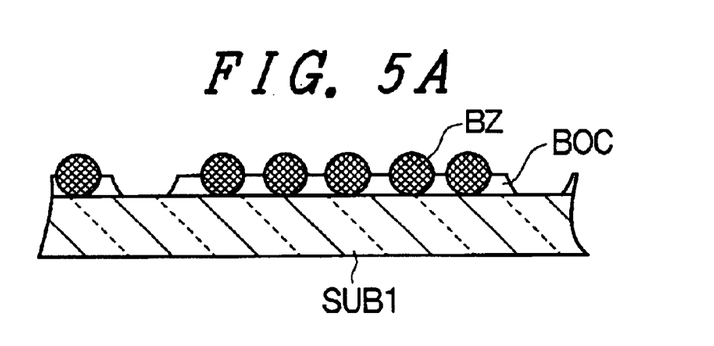
FIG. 5A and FIG. 5B are cross-sectional views of an essential part for explaining the summary of manufacturing steps of the second embodiment of the reflective-type liquid crystal display device according to the present invention.
Figure 5B:
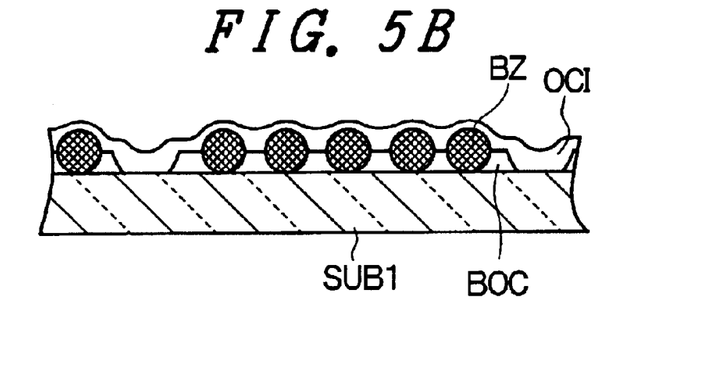

FIG. 5A and FIG. 5B are cross-sectional views of an essential part of one substrate of the liquid crystal display device for explaining the summary of manufacturing steps of the second embodiment of the reflective-type liquid crystal display device according to the present invention and FIG. 6A to FIG. 6D are cross-sectional views of an essential part which show steps following the manufacturing step shown in FIG. 5B. First of all, the photosensitive resin film BOC which is used as the binder resin in which fine particles made of acrylic resin are mingled as fine particles BZ is applied to an upper surface of a glass substrate as one substrate SUB1 of a pair of substrates which constitute the liquid crystal display device. Thereafter, the patterning defined in accordance with respective pixels is performed.

Figure 6A:
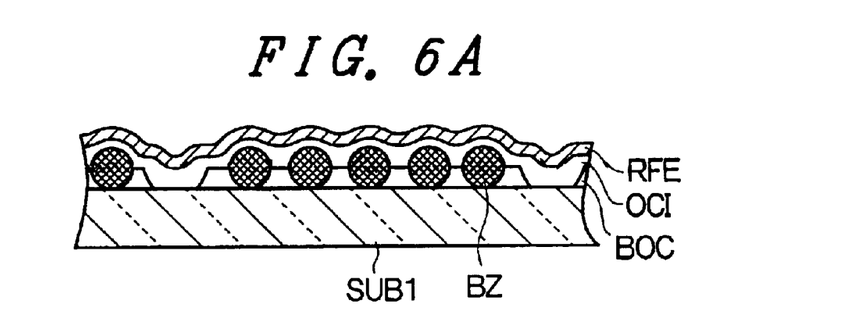
FIG. 6A shows a cross section in which a reflective electrode RFE made of aluminum alloy is formed on a leveling film OC1.

Portions of the fine particles BZ are protruded upwardly from the photosensitive resin film BOC. The space defined between respective fine particles BZ are filled with the photosensitive resin film BOC (FIG. 5A). Subsequently, the leveling film OC1 is applied to the substrate SUB1 such that the leveling film OC1 covers the fine particles BZ and the photosensitive resin film BOC (FIG. 5B). The leveling film OC1 performs a function of adjusting the degree of roughness of the reflective electrodes RFE generated by the fine particles BZ and the photosensitive resin film BOC. Thereafter, the reflective electrode RFE is formed using an aluminum alloy film (FIG. 6A). The reflective electrode RFE is formed by a film forming method which may preferably be a sputtering method such that the reflective electrode RFE exhibits a rough surface which follows the rough surface of the lower layer.

Figure 6B:
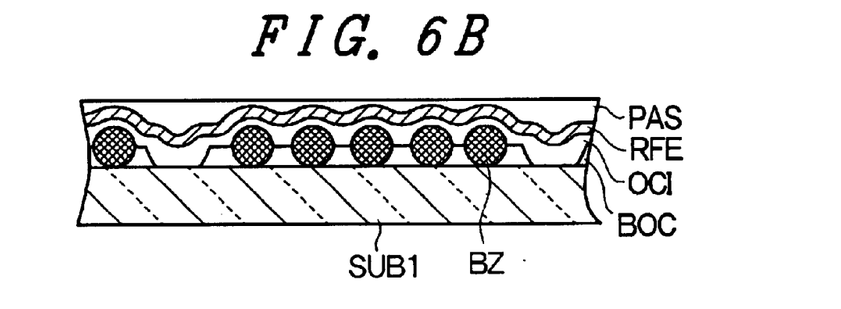
FIG. 6B shows a cross section in which an insulation film PAS is formed on the reflective electrode RFE.
Figure 6C:
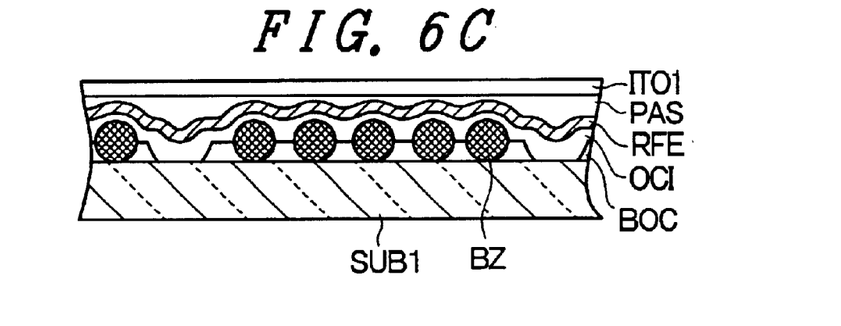
FIG. 6C shows a cross section in which a transparent conductive film ITO1 is formed on the insulation film PAS.
Figure 6D:
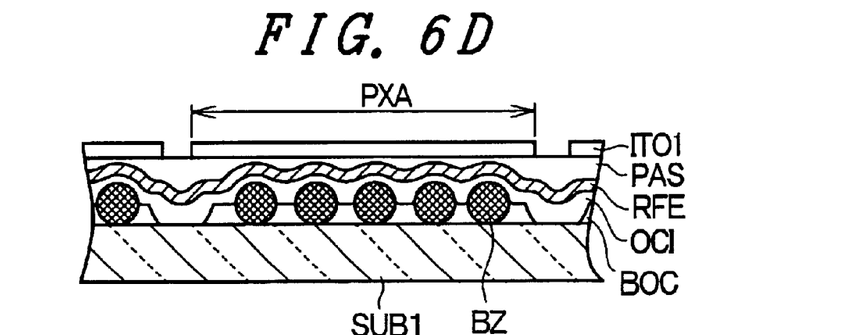
FIG. 6D shows a cross section in which the transparent conductive film ITO1 is divided in accordance with respective pixels.

The insulation film PAS is formed on the formed reflective electrode RFE (FIG. 6B). Thereafter, ITO1 which constitutes pixel electrodes is formed (FIG. 6C) and divided in accordance with respective pixels by patterning (FIG. 6D). In FIG. 6D, a region indicated by an arrow PXA constitutes a range of one pixel. Thereafter, an orientation film ORI1 (FIG. 4) is applied onto the pixel thus completing the manufacturing of one substrate.

Figure 7:
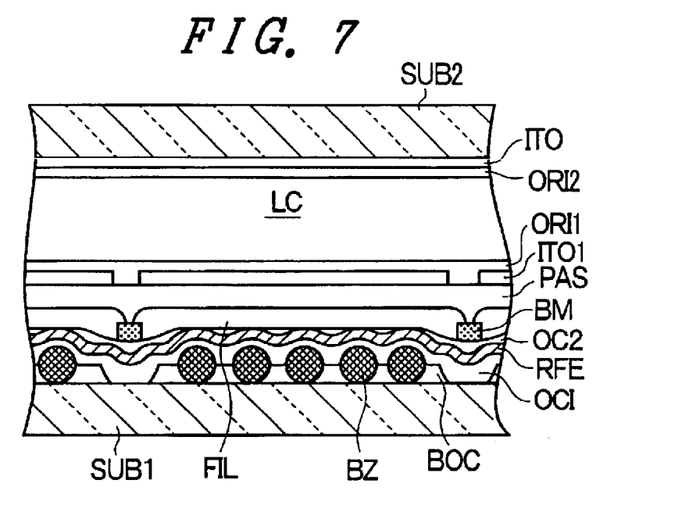
FIG. 7 is a cross-sectional view of an essential part for explaining the constitution of the third embodiment of the reflective-type liquid crystal display device according to the present invention.

FIG. 7 is a cross-sectional view of an essential part for explaining the constitution of the third embodiment of the reflective-type liquid crystal display device according to the present invention. In FIG. 7, reference symbol SUB1 indicates one substrate and reference symbol SUB2 indicates another substrate. This embodiment also relates to a case in which the present invention is applied to a simple-matrix-type liquid crystal display device.

On an inner surface of a glass substrate which constitutes one substrate SUB1, a resin film BOC into which fine particles BZ similar to those of the first and the second embodiments are mingled is formed. Portions of the fine particles BZ are protruded from the resin film BOC toward a reflective-electrode-REF side (another-substrate-SUB2 side). In other words, the fine particles BZ are formed such that the fine particles BZ are fixed by the resin film BOC which is embedded between the fine particles BZ. On the resin film BOC, a reflective electrode RFE having a shape which follows the protrusions of the fine particles BZ is formed by way of a leveling film OC1. The reflective electrodes also constitute light reflection film formed of a thin metal film which is preferably made of Al, Al—Nd, Cr, Ag or an alloy including these metals in the same manner as the previous embodiment.

In this embodiment, color filters FIL which are defined by a black matrix BM are formed on the reflective electrode RFE by way of a second leveling film OC2. An insulation film PAS is formed on the color filters FI1 and ITO1s which constitute pixel electrodes are formed on the insulation film PAS. Then, an orientation film ORI1 is formed such that the orientation film ORI1 covers the ITO1s and is subjected a given orientation treatment such as rubbing or the like. One substrate SUB1 and another substrate SUB2 are laminated to each other while sandwiching liquid crystal LC therebetween. To an inner surface of another substrate SUB2, a counter electrode ITO2 and an orientation film ORI2 are provided.

In this embodiment, a protective film OC1 is provided as a layer below the reflective electrode RFE and between the fine particles BZ and the resin film BOC so as to adjust the rough surface formed on the reflective electrode RFE However, the rough surface formed on the reflective electrode RFE may be adjusted by changing the distribution density, the height or the particle size of the fine particles BZ which are protruded from the resin film BOC or the thickness of the resin film BOC. In such a case, the above-mentioned protective film OC1 is not always necessary.

Further, at the time of performing the patterning of the reflective electrode RFE, by forming light-transmitting portions such as openings or slits in the reflective electrode per se or portions of peripheries thereof, the liquid crystal display device is formed into a semi-transmissive liquid crystal display device. Due to this embodiment, the light reflection efficiency of the reflective electrode is enhanced so that a reflective-type liquid crystal display device of high quality which enables a viewer to observe bright images from any viewing angles can be obtained.

Figure 8A:
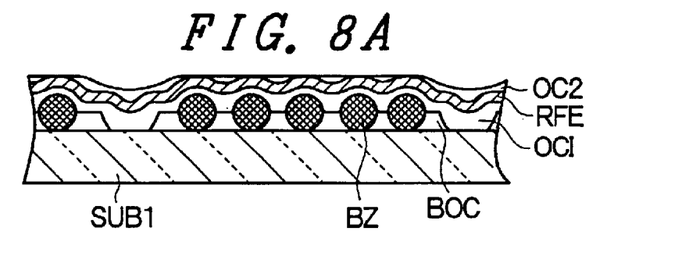
FIG. 8A shows a cross section in which a leveling film OC2 is formed on an undulated reflective electrode RFE.
Figure 8B:
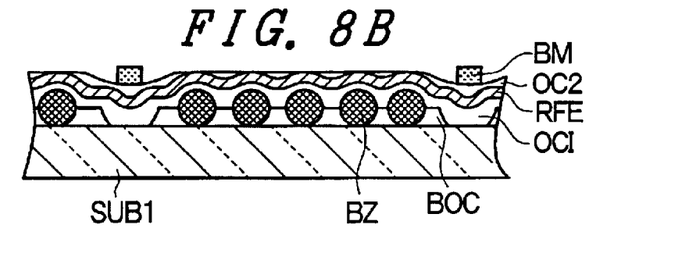
FIG. 8B shows a cross section in which a black matrix BM is formed on the leveling film OC2.
Figure 8C:
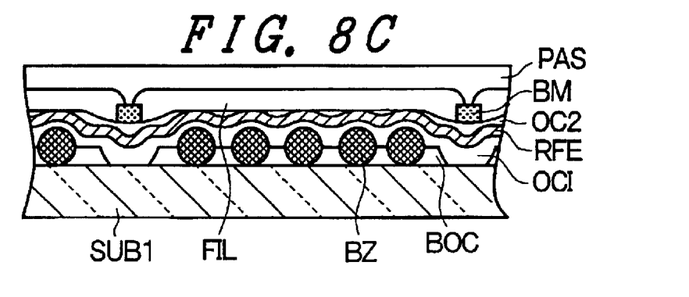
FIG. 8C shows a cross section in which an insulation film PAS which covers the black matrix BM and the color filter FIL is formed.
Figure 9A:
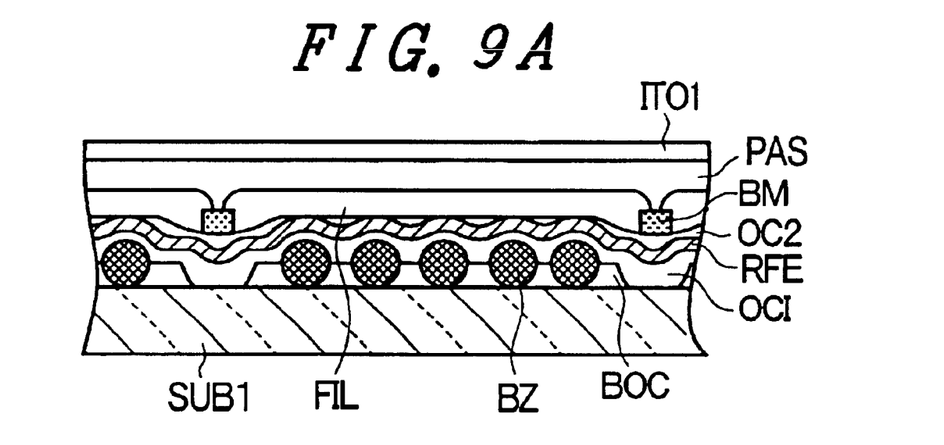
FIG. 9A shows a cross section in which a transparent conductive film ITO1 is formed on the insulation film PAS and FIG. 9B shows a cross section in which the transparent conductive film ITO is divided in accordance with respective pixels.
Figure 9B:
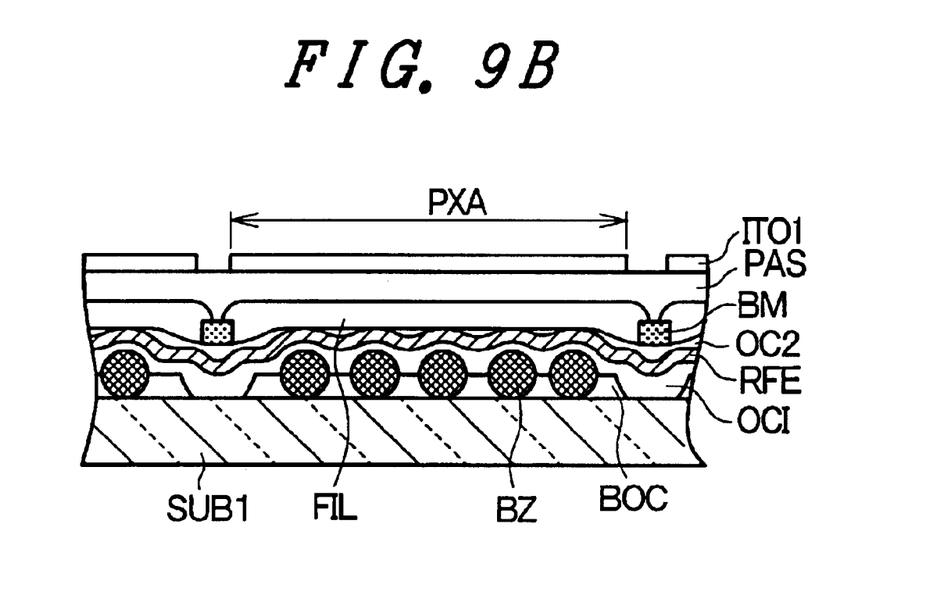

FIG. 8A to FIG. 8C are cross-sectional views of an essential part of one substrate of the liquid crystal display device for explaining the summary of manufacturing steps of the third embodiment of the reflective-type liquid crystal display device according to the present invention and FIG. 9A and FIG. 9B are cross-sectional views of an essential part which show steps following the manufacturing step shown in FIG. 8C. First of all, a photosensitive resin film BOC which is used as binder resin in which fine particles made of acrylic resin are mingled as fine particles BZ is applied to an upper surface of a glass substrate as one substrate SUB1 of a pair of substrates which constitute the liquid crystal display device. Thereafter, the patterning defined in accordance with respective pixels is performed.

Portions of the fine particles BZ are protruded upwardly from the photosensitive resin film BOC. The space defined between respective fine particles BZ are filled with the photosensitive resin film BOC. Subsequently, a leveling film OC1 is applied to the substrate SUB1 such that the leveling film OC1 covers the fine particles BZ and the photosensitive resin film BOC. The leveling film OC1 performs a function of adjusting the degree of roughness of a reflective electrode generated by the fine particles BZ and the photosensitive resin film BOC. Thereafter, the reflective electrode RFE is formed using an aluminum alloy film. The reflective electrode RFE is formed by a film forming method which may preferably be a sputtering method such that the reflective electrode RFE exhibits the rough surface which follows the rough surface of the lower layer. On the reflective electrode RFE formed in this manner, another leveling film OC2 is formed (FIG. 8A).

Further, the black matrix BM is formed on another leveling film OC2 (FIG. 8B). Then, the color filters FIL are formed and, thereafter, an insulation film PAS is formed on the color filters FIL (FIG. 8C). Thereafter, ITO1 which constitutes pixel electrodes is formed (FIG. 9A) and divided in accordance with respective pixels by patterning (FIG. 9B). In FIG. 9B, a region indicated by an arrow PXA constitutes a range of one pixel. Thereafter, an orientation film ORI1 (FIG. 7) is applied onto the pixels thus completing the manufacturing of one substrate.

The color filters which are formed on another substrate in the first embodiment according to the present invention which are explained in conjunction with FIG. 1 to FIG. 3D can be also formed on one substrate SUB1 side in the same manner as the third embodiment explained in conjunction with FIG. 7 to FIG. 9B. In this case, the color filters and the black matrix are formed as layers which are disposed above the reflective electrodes and below the orientation film.

Although the fine particles BZ are formed of fine particles made of epoxy resin or glass in the above-mentioned respective embodiments, the fine particles may be formed of black fine particles having photo-absorbency. Due to such a constitution, at the time of performing the patterning of the resin layer, the reflective electrode and other constituent layers using a photolithography technique, the halation which is generated when the exposure light is scattered due to the minute particles and is reflected on a exposure mask can be prevented so that the formation of the undesired patterns on regions other than the pattern forming regions can be obviated.

Further, by adding an ultraviolet ray absorbent into the photosensitive resin in which the fine particles are mingled, the ultraviolet rays can be absorbed in an ultraviolet-ray sensible region and hence, the above-mentioned halation at the time of exposure can be prevented. Alternatively, die having an ultraviolet ray absorbing effect (for example, yellow die) may be added into the photosensitive resin. Further, a colored resist which is prepared by scattering pigment in the photosensitive resin may be used.

Figure 10:
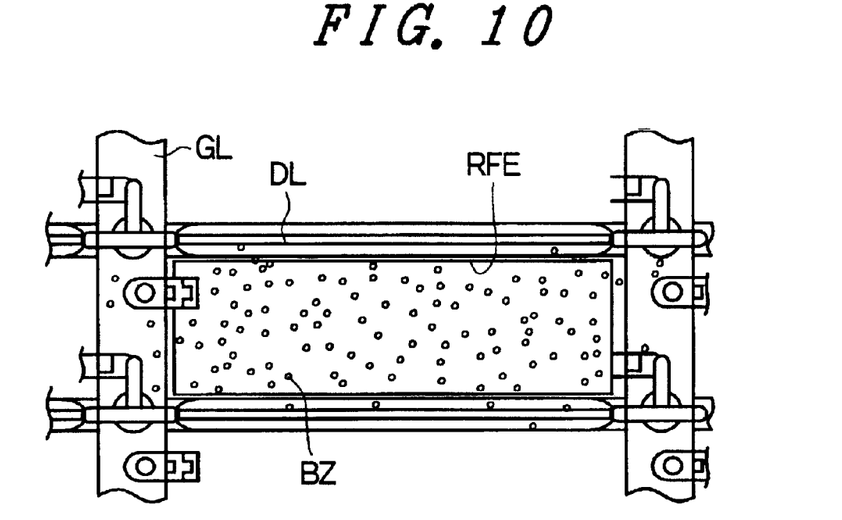
FIG. 10 is a plan view of one pixel of the reflective-type liquid crystal display device according to the present invention which is obtained by observing the display device from another substrate SUB2 side after removing an orientation film of one substrate corresponding to the first embodiment of the present invention.

FIG. 10 is a plan view of one pixel of the reflective-type liquid crystal display device according to the present invention which is obtained by observing the display device from another substrate SUB2 side after removing an orientation film of one substrate corresponding to the first embodiment of the present invention. In FIG. 10, GL indicates gate lines and DL indicates drain lines. The fine particles BZ according to the present invention are distributed in a region of a reflective electrode RFE and the surface of the reflective electrode RFE has a rough surface which follows the fine particles BZ. Due to such an reflective electrode RFE, the incident light from another substrate side can be efficiently reflected on and hence, the bright image can be obtained.

Figure 11:
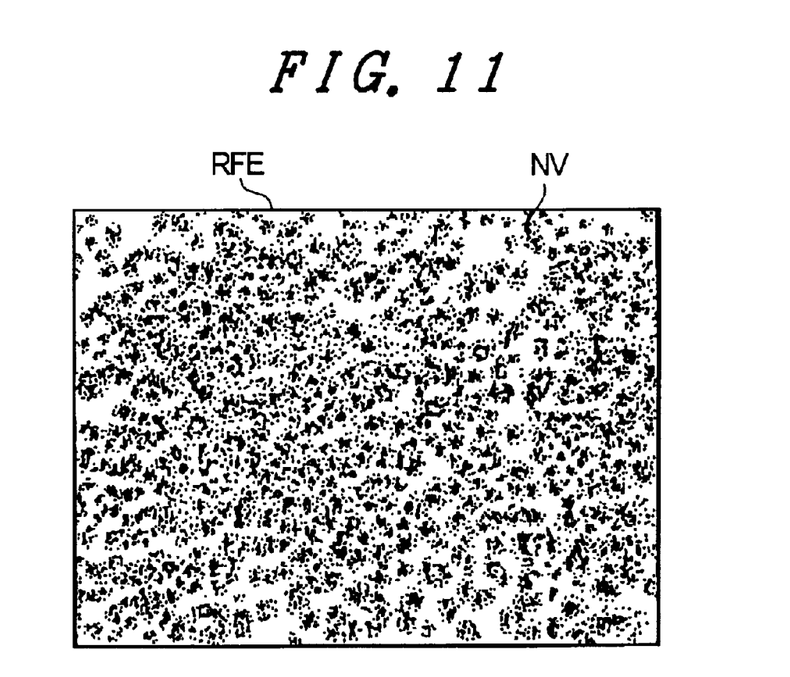
FIG. 11 is a plan view which shows a surface of the reflective electrode provided to the reflective-type liquid crystal display device according to the present invention in an enlarged form.

FIG. 11 is a plan view which shows the surface of the reflective electrode provided to the reflective-type liquid crystal display device according to the present invention in an enlarged form. On the surface of the reflective electrode RFE, a large number of protrusions NV formed of the above-mentioned fine particles BZ are formed. These protrusions NV efficiently scatter the incident light so that it is possible to provide images which are bright in a wide viewing angle. Subsequently, the light reflection effect of the reflective electrode in the reflective-type liquid crystal display device of the present invention is explained to confirm the presence of such an effect.

Figure 12:
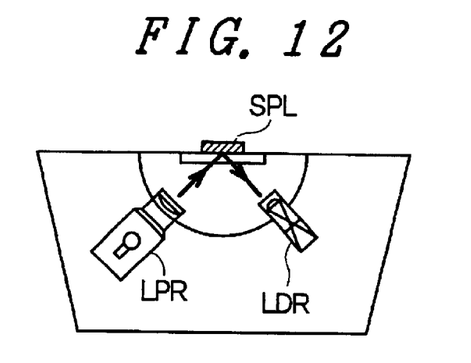
FIG. 12 is a constitutional view of a change-angle gross measuring device served for confirming the light reflection effect of the reflective electrode in the reflective-type liquid crystal display device of the present invention.
Figure 13:
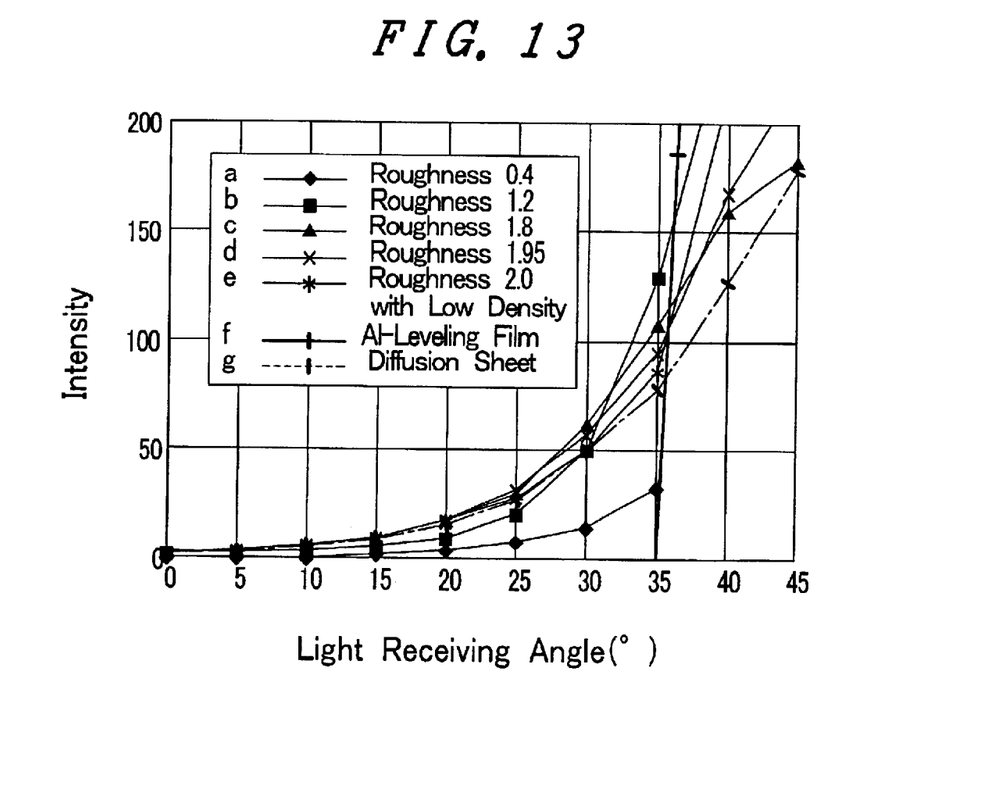
FIG. 13 is an explanatory view showing the measurement result of the reflective electrode in the reflective-type liquid crystal display device of the present invention.

FIG. 12 is a constitutional view of a change-angle gross measuring device served for confirming the light reflection effect of the reflective electrodes in the reflective-type liquid crystal display device of the present invention. In FIG. 12, LPR indicates a light projector, LDR indicates a light receiver and SPL indicates a sample. Further, FIG. 13 is an explanatory view of a result of the measurement. The change-angle gross measuring device used in the measurement is [VG-1D-type] made by Nihon Denshoku Kogyo Co., Ltd, wherein a light projecting angle was fixed to 45°. and a light receiving angle was changed in a range of 0 to 45°. The reflection effect of samples was relatively measured in view of the gloss measured values (intensity).

In this measurement, the density and the surface roughness of the fine particles in the resin binder film in which the fine particles are mingled were changed and were subjected to a comparison evaluation with a sample on which aluminum was applied by vapor deposition and a sample which was obtained by laminating a diffusion sheet to an aluminum-matted vapor deposition film. The vapor deposition condition of aluminum was set such that the degree of evacuated vacuum is $1.8 \times 10^{-2}$ Pa, the vapor deposition time is 16 seconds and a thickness of the aluminum film is 0.1 $\mu$m.

According to the result of the measurement shown in FIG. 13, with respect to the roughness of the sample SPL, a is 0.4 $\mu$m, b is 1.2 (1.25)$\mu$m, c is 1.8 $\mu$m, d is 1.95 $\mu$m, e is 2.0 $\mu$m. Also in FIG. 13, f indicates the roughness value of a leveling film made of aluminum and g indicates gross of the diffusion sheet for comparison. From the result of the measurement, it is understood that when the roughness is not less than 1.2 $\mu$m, the reflection intensity can be increased in a wide angular range.

In this manner, due to the embodiments of the present invention, it is possible to provide the reflective-type liquid crystal display device having the reflective electrodes which can simplify the structure and the manufacturing steps of the liquid crystal display device and, at the same time, can exhibit the high reflection performance.

As has been described heretofore, according to the present invention, the patterning of the resin layer which requires the complicated steps is unnecessary. Further, by adjusting the degree of dispersion and the size of the mingled fine particles or the degree of protrusion of portions of the fine particles protruded from the surface of the resin binder layer, the magnitude of the roughness of the reflective electrode which are formed as the layer above the resin binder layer can be controlled. Accordingly, it is possible to provide the reflective-type liquid crystal display device of high quality which can simplify the manufacturing steps and yet is provided with the reflective electrode having desired reflection performance.

What is claimed is:

1. A reflective-type liquid crystal display device comprising:
    a liquid crystal layer interposed between a first substrate and a second substrate;
    a reflective electrode being formed on an inside surface of the first substrate and reflecting incident light from the second substrate back toward the second substrate;
    a resin layer into which a plurality of fine particles are embedded and fixed therein being disposed between the first substrate and the reflective electrode;
    a leveling layer being formed between the resin layer and the reflective electrode;
    an insulation film formed on the reflective electrode; and
    a pixel electrode formed on the insulation film, wherein
    upper portions of the fine particles protrude from the resin layer to increase a degree of roughness of a reflection surface of the reflective electrode,
    the leveling layer covers the resin layer and the upper portions of the fine particles to moderate the degree of roughness of the reflection surface of the reflective electrode, and
    the pixel electrode is disposed above the reflective electrode and made of a transparent conductive film.

2. A reflective-type liquid crystal display device according to claim 1, wherein switching elements for selecting pixels are provided in the inside surface of the first substrate.

3. A reflective-type liquid crystal display device according to claim 1, wherein a color filter is provided in an inside surface of the second substrate.

4. A reflective-type liquid crystal display device according to claim 1, wherein a color filter is provided in the inside surface of the first substrate.

5. A reflective-type liquid crystal display device according to claim 4, wherein the color filter is provided at side of the reflective electrode close to the second substrate.

6. A reflective-type liquid crystal display device according to claim 1, wherein spacer beads or columnar spacers for preserving a gap between the pair of substrates at a predetermined value are provided therebetween, and the fine particles are finer than the spacer beads or the columnar spacers.

7. A reflective-type liquid crystal display device according to claim 1, wherein the resin layer is photosensitive.

8. A reflective-type liquid crystal display device according to claim 7, wherein the fine particles have photo-absorbency.

9. A reflective-type liquid crystal display device according to claim 1, wherein the fine particles are made of epoxy resin or glass.

10. A reflective-type liquid crystal display device according to claim 1, wherein the reflective electrode is a thin metal film formed on the leveling film.

11. A reflective-type liquid crystal display device according to claim 10, wherein the thin metal film is made of Al, Al-Nd, Cr, Ag, and a combination thereof.

12. A reflective-type liquid crystal display device according to claim 10, wherein the thin metal film is formed on the leveling film by a sputtering method.

13. A reflective-type liquid crystal display device according to claim 1, wherein an upper surface roughness of the reflective electrode form on the leveling film is not less than 1.2 $\mu$m.

14. A reflective-type liquid crystal display device according to claim 13, wherein an upper surface roughness of the reflective electrode is in a range of 1.2–2.0 $\mu$m.

* * * * *